United States Patent [19]
Walega et al.

[11] Patent Number: 5,762,580
[45] Date of Patent: Jun. 9, 1998

[54] OPERATING RANGE SELECTION OF AN AUTOMATIC TRANSMISSION

[75] Inventors: Kenneth Gerard Walega, Allen Park; Robert Clayton Roethler, Howell; John Arthur Daubenmier, Canton; Eldon L. Goates, Maryland, all of Mich.

[73] Assignee: Ford Global Technologies, Inc., Dearborn, Mich.

[21] Appl. No.: 254,835

[22] Filed: Jun. 6, 1994

[51] Int. Cl.⁶ ..................................... F16H 61/26
[52] U.S. Cl. .................. 477/130; 477/134; 477/138
[58] Field of Search ..................... 477/130, 131, 477/138, 134, 127; 475/131, 132

[56] References Cited

U.S. PATENT DOCUMENTS

| | | | |
|---|---|---|---|
| 3,181,386 | 5/1965 | Schaefer | 477/127 |
| 3,675,508 | 7/1972 | Blank | 74/357 |
| 3,695,121 | 10/1972 | Corrigan et al. | 475/132 |
| 4,047,454 | 9/1977 | McQuinn | 477/127 |
| 4,558,612 | 12/1985 | Shimizu et al. | 477/115 |
| 4,896,568 | 1/1990 | Grierer | 477/138 |
| 4,905,530 | 3/1990 | Stehle et al. | 74/335 |
| 4,987,792 | 1/1991 | Mueller et al. | 74/473 R |
| 5,009,128 | 4/1991 | Seidel et al. | 477/122 |
| 5,305,663 | 4/1994 | Leonard et al. | 475/123 |
| 5,305,664 | 4/1994 | Wakahara | 477/127 |

OTHER PUBLICATIONS

U.S. application Ser. No. 08/254,833, filed Jun. 6, 1994, "Operating Range Selection of an Automatic Transmission".
U.S. application Ser. No. 08/254,832, filed Jun. 6, 1994, "Operating Range Selection of an Automatic Transmission".

*Primary Examiner*—Charles A. Marmor
*Assistant Examiner*—Sherry Lynn Estremsky
*Attorney, Agent, or Firm*—Frank G. McKenzie

[57] ABSTRACT

A rotary switch, used to select the operating range of an automatic transmission, controls solenoid-operated valves corresponding to the selected range to open and close a connection between a range valve assembly and a control pressure source. A forward range selection electric circuit includes a forward range high side driver, a solenoid-operated control valve, the rotary switch, a power source, and a current monitor. There is a similar circuit for the reverse range. A forward range valve and reverse range valve respond to control pressure produced by the circuit to open a fluid pressure source to a line that is pressurized to produce forward drive, a second position opens a connection between the fluid pressure source and a line that is pressurized to produce reverse drive and vents those lines to sump.

6 Claims, 4 Drawing Sheets

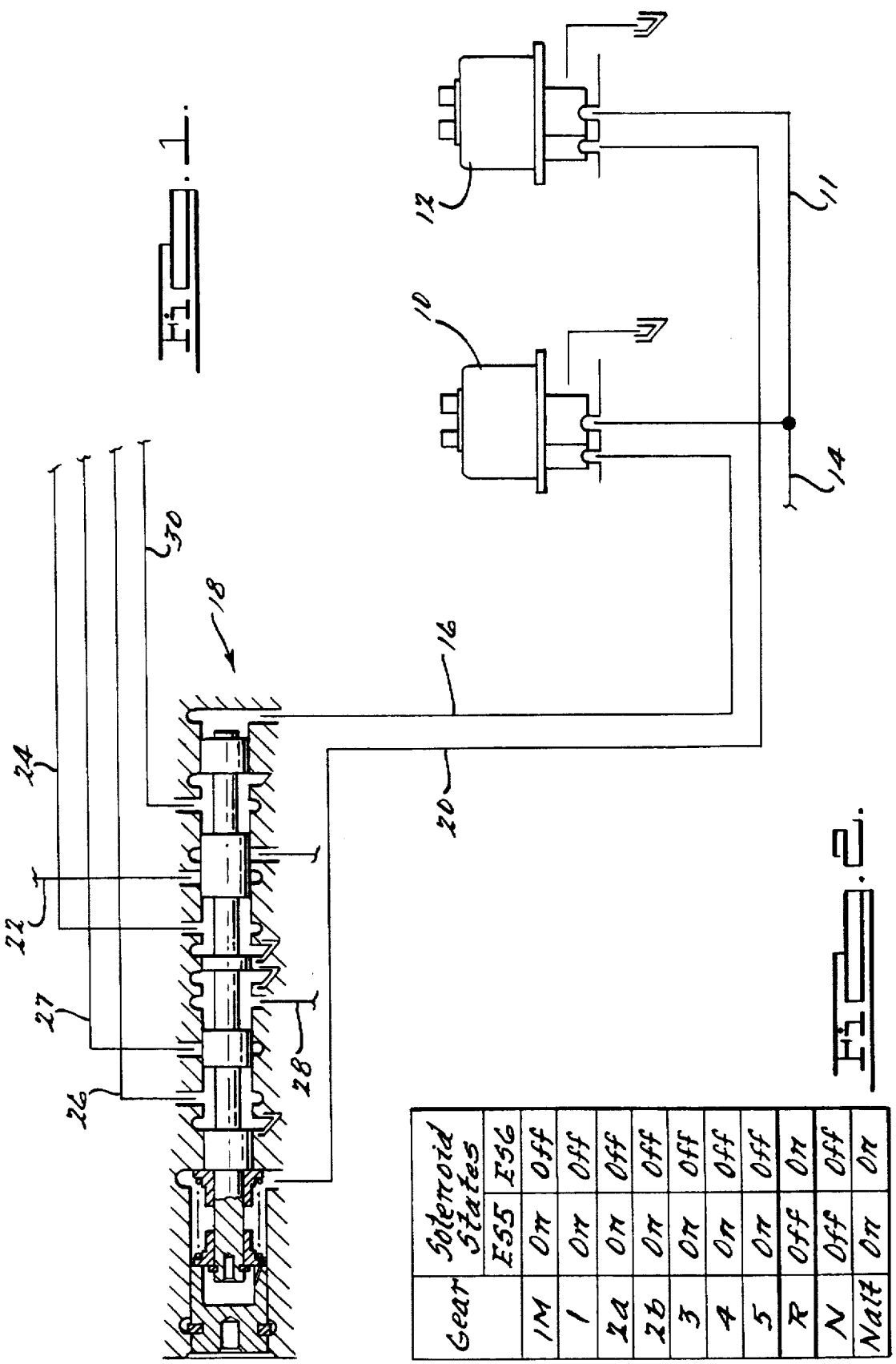

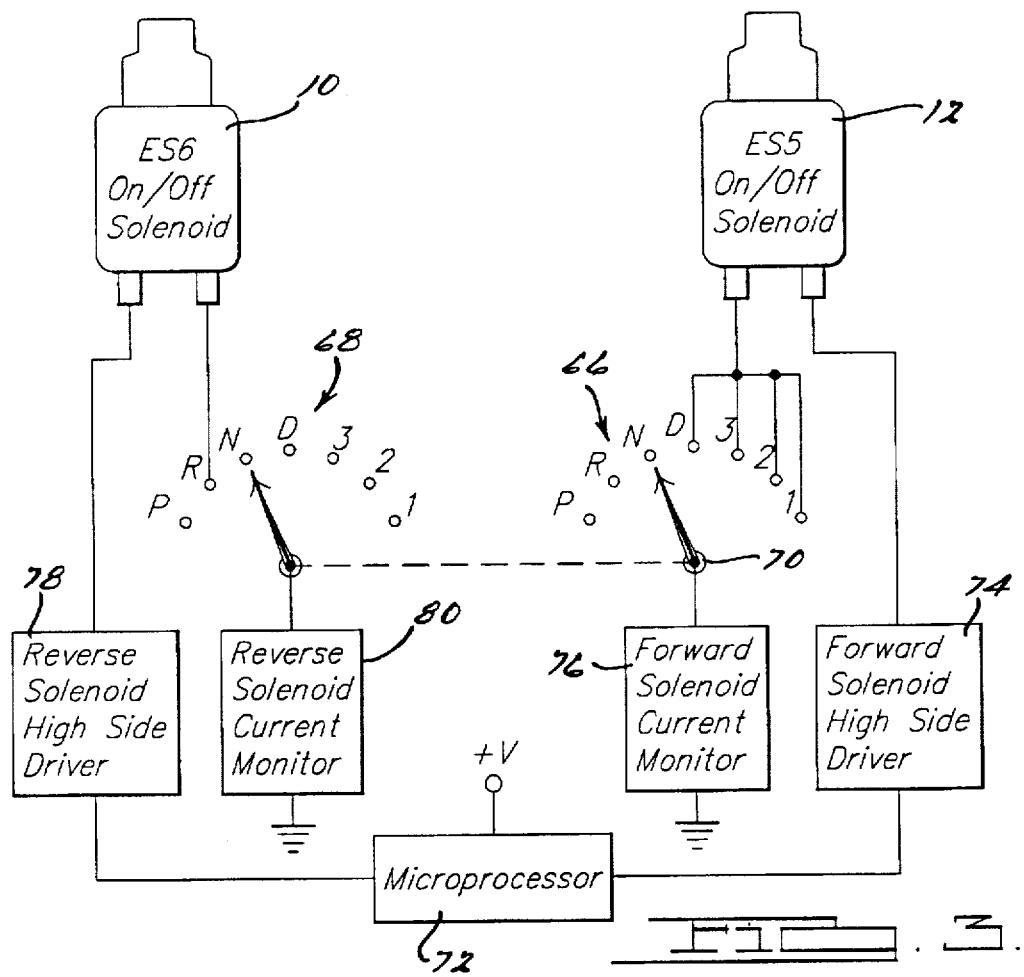
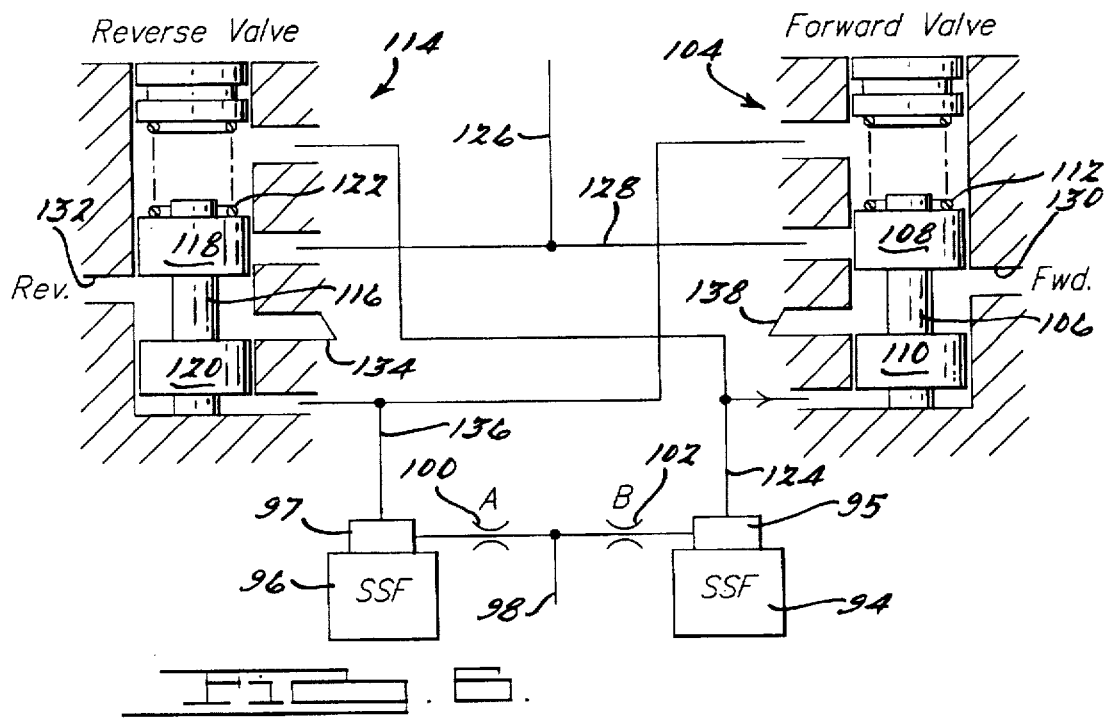

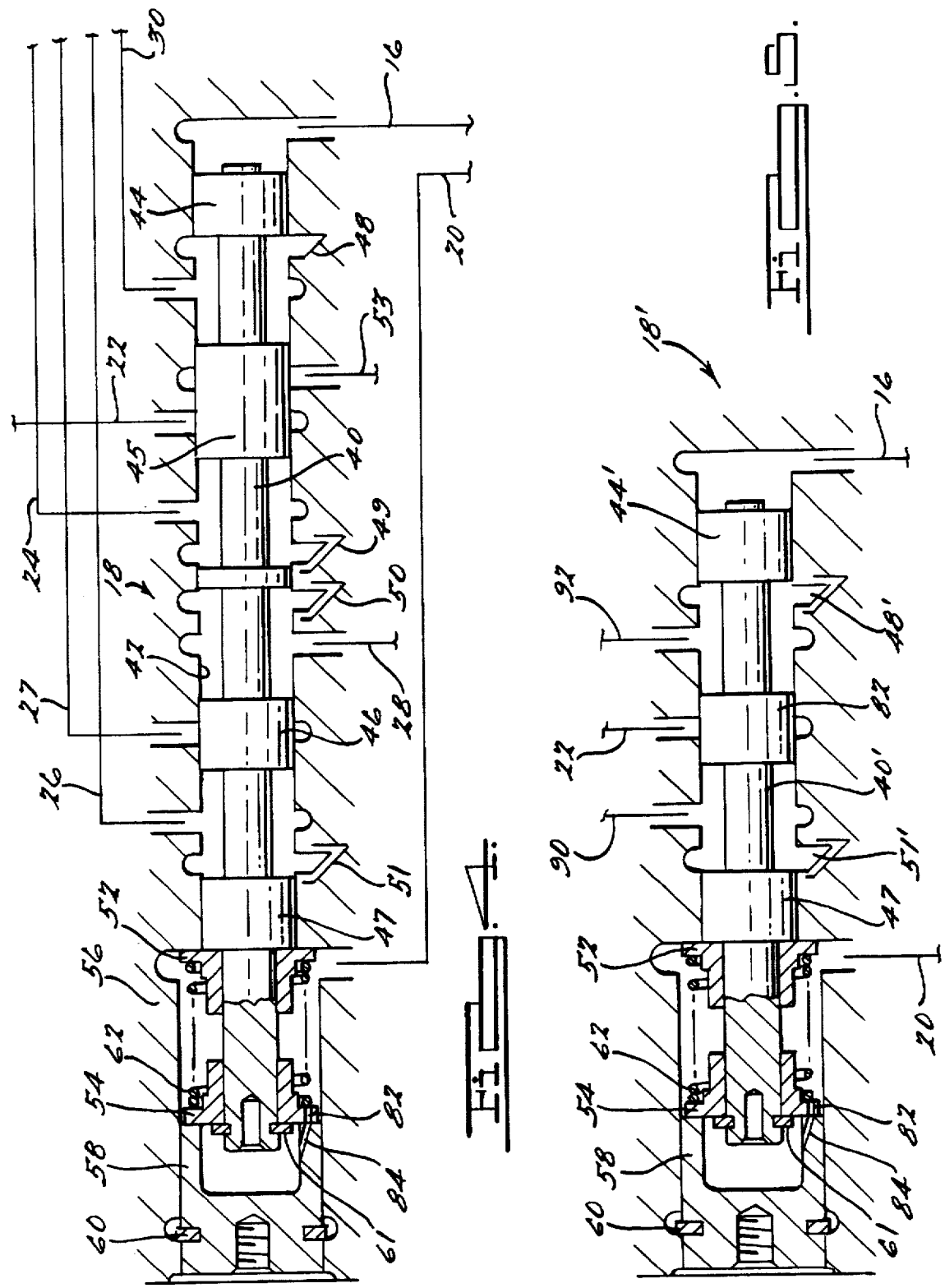

| Range | Solenoid State | |
|---|---|---|
| | SSF | SSR |
| Reverse | 0 | 1 |
| Forward | 1 | 0 |
| Neutral | 0 | 0 |
| Neutral | 1 | 1 |
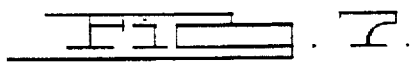
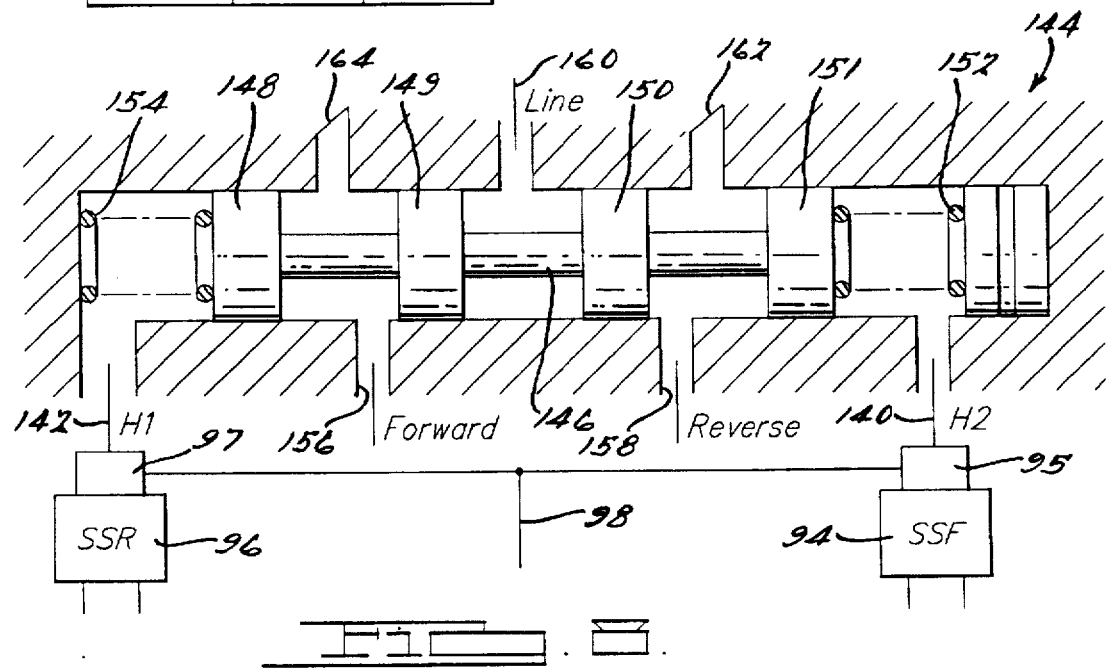
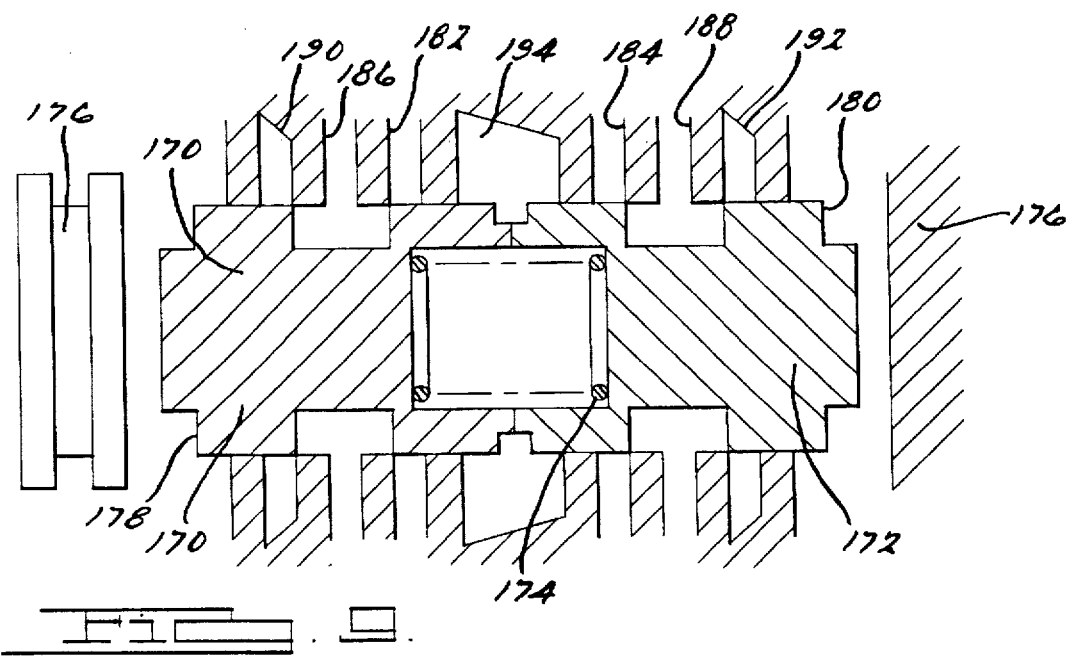

OPERATING RANGE SELECTION OF AN AUTOMATIC TRANSMISSION

BACKGROUND OF THE INVENTION

1. Field of the Invention

This invention pertains to the field of the control of automatic transmissions for motor vehicles. More particularly, the invention pertains to control of a hydraulic circuit used to actuate friction elements that produce various speed ratios of an automatic transmission.

2. Description of the Prior Art

In a conventional automatic transmission, the vehicle operator changes the position of the gear selector lever among various operating ranges, including the park, reverse, neutral, drive, and low ranges. A series of mechanical linkages transmit movement of the gear selector to a manual valve located in a valve body of the automatic transmission. The manual valve includes a valve spool having several control lands, the spool located in a valve chamber and supported in the chamber for sliding movement along the axis of the chamber. The valve alternately opens and closes a connection between a fluid pressure source and a portion of a hydraulic circuit that is pressurized to produce the forward gear ratios, and another portion of the hydraulic circuit that is pressurized to produce reverse drive. The valve closes the fluid pressure source to the forward and reverse drive portions of the hydraulic circuit when the neutral range and park range are selected by the operator.

Use of a relatively large shift lever intrudes into the passenger compartment and has long been considered intrusive and incompatible with interior design and packaging. Furthermore, due to space limitation in the engine compartment, it is often difficult to locate the linkages and rods that connect the shift lever to the manual valve. This problem is made yet more difficult when the valve body is disposed at an awkward angle with respect to the motion-transmitting linkage.

Various attempts have been made to replace the gear range selector lever with push-button devices. Most recent attempts employ an electric motor, often a stepper motor, and a switching system for controlling the motor. A manual valve within the valve body of the transmission is moved within a valve chamber by the motor at positions within the chamber that corresponds to the selected range.

SUMMARY OF THE INVENTION

It is an object of this invention to provide a system for electronically actuating forward drive, neutral, and reverse drive of an automatic transmission in accordance with the operating range selected by the vehicle operator. Hydraulically actuated friction elements are alternately engaged to produce forward drive when a portion of a hydraulic circuit is connected to a fluid pressure source and disengaged when the forward drive portion of the circuit is disconnected from the fluid pressure source. Similarly, other friction elements are engaged to produce reverse drive when a portion of the hydraulic circuit is connected through a control valve to a fluid pressure source and disengaged when that connection is closed. When a neutral range is selected by the operator, neither the forward drive nor reverse drive portions of the hydraulic circuit are connected to the fluid pressure source.

To accomplish this result, a connection between a fluid pressure source and the control valve is opened and closed alternately through operation of solenoid-operated valves by energizing and deenergizing the solenoids that control those valves in response to electrical signals produced in response to the selected range of operation.

A rotary switch, used to select the operating range of an automatic transmission, controls solenoid-operated valves corresponding to the selected range to open and close a connection between a range valve and a control pressure source. A forward range selection electric circuit includes a forward range high side driver, a solenoid-operated control valve, the rotary switch, a power source, and a current monitor. There is a similar circuit for the reverse range. A forward range valve and reverse range valve respond to control pressure produced by the circuit to open a fluid pressure source to a line that is pressurized to produce forward drive, a second position opens a connection between the fluid pressure source and a line that is pressurized to produce reverse drive and vents those lines to sump.

In realizing these objects and advantages, a system for selecting operating ranges of an automatic transmission according to the present invention includes a source of pressurized hydraulic fluid, a source of control pressure, a range selector having means for producing signals representing operating ranges of the transmission, hydraulic circuit means having a first portion associated with a first range and a second portion associated with a second range; and valve means, responsive to said signals and having a vent port, for alternately connecting the pressure source and one of the first portion and second portion and connecting the vent port and the other of the first portion and second portion.

BRIEF DESCRIPTION OF THE DRAWINGS

FIG. 1 is a schematic diagram of a system according to the present invention.

FIG. 2 is a schedule showing the on/off state of certain solenoids of the system of FIG. 1 and the corresponding operating range of the transmission.

FIG. 3 is a schematic diagram of an electric circuit including switches used to select the operating range of the transmission.

FIG. 4 is a cross section through a valve body showing the range selection valve of FIG. 1 in a larger scale.

FIG. 5 is an alternate embodiment of the valve of FIG. 4.

FIG. 6 is a schematic diagram of a range selection valve adapted for use with the circuit of FIG. 3.

FIG. 7 is a table showing the relationship of the state of the solenoids of FIG. 6 to the selected operating range of the transmission.

FIG. 8 is a schematic diagram of a range selection valve adapted for use with the circuit of FIG. 3.

FIG. 9 is a cross section of a range selection hydraulic valve adapted for use with the circuit of FIG. 3.

DESCRIPTION OF THE PREFERRED EMBODIMENT

The hydraulic system of FIG. 1 includes a reverse-range solenoid 10 and forward-range solenoid 12, which are three-way, normally closed on/off solenoids supplied from a source of pressurized hydraulic fluid carried through line 14 at a solenoid feed control pressure. Solenoids 10, 12 close a connection between a source of control pressure in line 14, except when a source of electric power is connected to the solenoids. When solenoid 10 is energized, a connection is opened between line 14 and line 16, which is connected to a port of manual or range valve 18. When solenoid 12 is energized, a connection is opened between line 14 and line 20, which is also connected to manual valve 18. When solenoids 10, 12 are deenergized, lines 16, 20 are exhausted through the third port of the three-way solenoid valves.

Range valve 18 alternately opens and closes connections between a line pressure source, carried in line 22, to friction elements that are pressurized to produce forward drive including a forward clutch, which is pressurized through line 24, and intermediate clutch which is pressurized through line 26 when the forward range is selected. Range valve 18 closes the connection between the pressure source and the forward drive friction elements when the vehicle operator selects a range other than the forward ranges. Valve 18 alternately opens and closes a connection between the pressure source and reverse brake band, which is pressurized through line 28, and a friction clutch, which is pressurized through line 30, when the reverse range is selected.

Referring now to FIG. 4, range valve 18 includes a valve spool 40 slidably supported in a valve chamber 42 and having control lands 44–47 spaced axially along the length of the spool, and four vent ports 48–51 connecting chamber 42 to a low pressure sump (not shown).

Located at the left-hand end of range valve 18 are retainers 52, 54, which provide surfaces on which the valve spool moves axially. Retainer 52 is adapted to contact an immovable surface 56, part of the valve body, and guide 54 is adapted to contact a plug 58, held in position on the valve body 56 by a spring clip 60, plug 58 closing the left-hand end of chamber 42. A clip 61, carried on the spool, limits movement of retainer 54 relative to the spool. A compression spring 62, located between facing surfaces of retainers 52, 54, operates to urge them toward contact on valve body 56 and plug 58, respectively.

The vehicle operator selects the operating ranges by manipulating the two rotary switches 66, 68 illustrated in FIG. 3. The two switches rotate on the same shaft 70 and move together as a unit in response to action by the vehicle operator. When a forward drive range is selected, i.e., when the operator selects range D, 3, 2, or 1, switch 66 completes an electrical circuit that includes a d.c. high voltage (12 volts) power source, forward-range solenoid 12, high side driver 74, and forward solenoid current monitor 76. When ranges N, R, and P are selected, switch 66 opens the circuit that includes solenoid 12. In response to signals produced by a microprocessor 72, high side driver 74 opens and closes a connection to power source. Therefore, if driver 74 is operating incorrectly, perhaps due to a short in its circuit or a malfunction in the microprocessor, such that the power source is connected to solenoid 12 even though reverse drive is the range selected by the operator, the forward range circuit is open because rotary switch 66 is then in the R range, where the forward range circuit is open. Current monitor 76 verifies circuit integrity on the basis of the magnitude of electric current in the circuit. Current monitor 76 provides yet another means for preventing occurrence of a potential failure of the forward range selection circuit.

When the vehicle operator selects the reverse range, switch 68 closes an electrical circuit that includes power source, reverse-range solenoid high side driver 78, solenoid 10, and current monitor 80. When the forward, neutral or park range is selected, switch 68 opens the circuit that includes solenoid 10. High side driver 78 and current monitor 80 prevent failure of the reverse range selection circuit in the manner discussed above with respect to the forward range selection circuit.

When the forward range is selected, solenoid 12 opens a connection between the control pressure source, carried to the solenoid through line 11, and line 20. Control pressure in line 16 is exhausted. Pressure in line 20 is carried through passages 82, 84, formed in retainer 54 and plug 58, to the left-hand end of spool 40. Pressure developed on the left-hand end of retainer 52 operates to move the retainer along spool 40 into contact with the valve body 56. Spring 62 holds retainer 54 against clip 61 and pressure on the left-hand end of spool 42 forces the spool rightward until land 44 contacts the adjacent valve body. With the spool in this position, land 45 opens a connection between the pressure source, line 22, and line 24, through which a forward clutch is pressurized during operation in forward drive.

Chamber 42 is opened to the sump through vents 49, 50. line 30 is vented through vent port 48, land 46 opens line 27 to line 26, through which an intermediate clutch is engaged during forward drive operation, vent port 51 is closed by land 47, and a reverse band is released by connecting passage 28 to vent port 50.

When the reverse range is selected, solenoid 10 is energized and hydraulic line 16 is connected to a relatively high control pressure source, thereby moving the spool leftward within the valve chamber to a point where retainers 52, 54 contact mutually or the spool contacts plug 58. With the valve in this position, land 44 closes vent port 48, land 45 opens a connection between line 53 and line 30, which is connected to a reverse clutch during operation in the reverse range, land 45 closes line 22, line 24 is exhausted through vent port 49, land 46 opens a connection between line 27, which carries high pressure when the reverse range is selected, and line 28, which is connected to a low-reverse band during operation in the R-range, line 26 is open to sump through vent port 51.

When the neutral range is selected, solenoids 10, 12 close control pressure line 14, and pressure at each end of spool 40 declines. The spool moves to the position of FIG. 4, where line pressure 22 is closed to the forward drive and reverse drive portions of the hydraulic circuit.

The range valve of FIG. 4 requires a predetermined pressure at either the right-hand end or left-hand end of valve spool 40, preferably a pressure magnitude of 15 psi, in order to move the valve spool from the neutral position shown in FIG. 4. The magnitude of the pressure required for this purpose is determined by the force of spring 62.

An alternate form of the range valve, shown in FIG. 5, pressurizes line 90 to produce forward drive and vents line 90 when a forward range is not selected, and pressurizes line 92 to produce reverse drive and vents line 92 when the reverse range is not selected.

The fluid pressure source, at line pressure magnitude, is supplied to valve 18, through line 22, and the control pressures, the output from solenoids 10 and 12, are carried to range valve 18' through lines 16, 20, respectively. When one of the forward ranges, D, 3, 2, or L is selected, control pressure in passage 16 decreases, and pressure in passage 20 increases to approximately 60 psi. This action forces spool 40' to move to the right-hand extremity of the valve chamber due to the large pressure force developed at the left-hand end of the valve in opposition to the force of spring 62 and the pressure force at the right-hand end of the valve. With the valve so disposed, land 82 opens a connection between line pressure in line 22 and line 90, which is connected to that portion of the hydraulic circuit that is pressurized to produce forward drive, line 92 is vented through exhaust passage 48', and vent port 51' is closed by control land 47.

When the vehicle operator moves the range selector to the reverse position, thereby turning solenoid 12 off and reverse solenoid 10 on, pressure in passage 16 increases to approximately 60 psi and pressure in passage 20 decreases. This action develops on the right-hand end of control land 44, a pressure force that moves spool 40' leftward in the valve chamber to a position where the spool contacts the adjacent face of plug 58, and spring 62 is compressed between the retainers 52, 54. With the valve so disposed, the fluid pressure source is connected through line 22 to line 92, that portion of the hydraulic circuit that is pressurized to produce reverse drive, the vent port 48' is closed by land 44', and line 90 is vented through port 50'.

When the neutral or park range is selected, solenoids 10 and 12 are deenergized and pressure in Lines 16, 20, and at the left-hand and right-hand ends of the valve spool, decline. The valve then returns to the neutral position shown in FIG. 5 where the line pressure is closed by land 82 and lines 90, 92 are exhausted through vent ports 51', 48'.

A rotary switch is used to select the operating ranges of the automatic transmission. Solenoid-operated valves corresponding to the selected range open a connection between a range valve and control pressure source. The range valve has three positions and is centered by one compression spring. One position opens the fluid pressure source to a line that is pressurized to produce forward drive, a second position opens a connection between the fluid pressure source and a line that is pressurized to produce reverse drive, and a third position vents those lines to sump. The spring locates the valve at the center position and makes the valve insensitive to force tolerances and spring variations. For example, the range valve will not move until a predetermined control force is applied at either end of the valve spool.

Referring now to FIGS. 6 and 7, two solenoid-operated hydraulic valves 95, 97 are supplied from a source of fluid control pressure 98 and orifices 100, 102. Valves 95, 97 are normally closed or normally open, two-port valves controlled by solenoids 94 and 96, respectively. A forward valve 104 includes a valve spool 106, control lands 108, 110, and compression spring 112, which biases spool 106 to the lower end of the valve chamber. A similar reverse valve 114 includes a valve spool 116, control lands 118, 120, and compression spring 122, which biases spool 116 to the lower end of the valve chamber.

When a forward range is selected, the electrical circuit that includes solenoid 94 is closed, solenoid 94 is energized, allowing pressure to rise in hydraulic line 124, and solenoid 96 is deenergized. Pressure in line 124 forces valve spool 106 upward, connecting the line pressure source through lines 126 and 128 to be connected to passage 130, which supplies pressure to that portion of the hydraulic circuit required to be pressurized to produce forward drive. The pressure in line 124 forces spool 116 of the reverse valve 114 downward, thereby connecting passage 132, which supplies pressure to another portion of the hydraulic circuit required to be pressurized to produce reverse drive, to vent port 134.

When the reverse range is selected, rotary switches 66, 68 complete the electrical circuit that includes solenoid 96 and opens the circuit that includes solenoid 94. This action energizes solenoid 96 and allows hydraulic pressure to increase in line 136. This pressure forces spool 116 upward within its chamber, thereby connecting line pressure in line 126 to passage 132, forcing spool 106 of forward valve 104 downward within its chamber, and connecting passage 130 to the vent port 138.

When the neutral range is selected, rotary switches 66, 68 open the forward range and reverse range circuits, which action exhausts pressure in lines 130, 132 through vent ports, 134, 138 and closes the connections between line pressure source 126, forward circuit 130, and reverse circuit 132, due to the effect of compression springs 112, 122. If solenoids 94, 96 are energized concurrently so that lines 124, 136 carry high pressure, forces on the end face of control lands 108, 110 are balanced and spool 106 is forced downward by compression spring 122, thereby connecting passage 130 and vent port 138. Similarly, the pressure forces on the ends of lands 118, 120 are balanced, compression spring 122 forces spool 116 downward, thereby connecting passage 132 and vent 134.

The chart of FIG. 7 summarizes the range produced by control circuit of FIG. 6 in accordance with the indicated state of solenoids 94, 96.

The control circuit of FIG. 8 includes two-port, normally-open or normally-closed control valves 95, 97, controlled respectively by solenoids 94, 96, substantially as described with reference to FIGS. 6 and 7. These solenoids alternately connect a source of control pressure in line 98 to control passages 140 and 142, respectively. A range valve 144 includes a spool 146, supported slidably in a valve chamber on control lands 148, 151 and two compression springs 152, 154, biasing spool 146 to a centralized position within the valve chamber. A forward control passage 156 is pressurized when forward drive is produced by the transmission, and reverse passage 158 is pressurized when reverse drive is produced. Passages 156, 158 are otherwise vented. Valve 144 is continually connected through line 160 to a source of high pressure hydraulic fluid, and vent ports 162, 164 connect the valve chamber to a low pressure sump.

When a forward range is selected, the forward range electrical circuit is closed and valve 95 opens a connection between line 98 and line 140, but the reverse range circuit is opened so that valve 97 closes the connection between line 98 and line 142. As a result of this action, a pressure force, developed on the right-hand face of land 151, forces spool 146 leftward, thereby opening a connection between reverse passage 158 and vent port 162, and opening a connection between line 160 and forward passage 156.

When reverse range is selected, the rotary switches 66, 68 open the forward range circuit and close the reverse range circuit, thereby connecting the control pressure source, line 98, to passage 142. This action produces a pressure force on the left-hand face of land 148 forcing spool 146 rightward, thereby opening a connection between forward passage 156 and vent 164 and opening a connection between line 160 and reverse passage 158.

When the neutral range is selected, solenoids 94 and 96 are deenergized by opening the electrical circuits that includes those solenoids, and pressure in passages 140, 142 is closed to the elevated control pressure in line 98. Therefore, spool 146 is biased to the center position by the effect of compression springs 152, 154, the position shown in FIG. 8. With the valve in this position, forward passage 156 and reverse passage 158 are open to vent ports 164, 162, respectively.

The range valve shown in FIG. 9 includes a forward range spool 170 and a reverse range spool 172, each spool located concentrically about the axis of a valve chamber and biased apart mutually by a compression spring 174 toward contact with the valve body 176. Forward control pressure from the forward range control valve 95, operated by forward range solenoid 94, enters the valve chamber through passage 178.

Reverse pressure from reverse range control valve 97, operated by reverse range solenoid 96, enters the valve chamber through passage 180. The line pressure source is connected to the valve chamber through passages 182, 184. The portion of the hydraulic circuit that is pressurized to produce forward drive is pressurized through passage 186; the portion of the hydraulic circuit that is pressurized to produce reverse drive is pressurized through passage 188.

When the park range or neutral range is selected, neither of the two solenoid-operated valves 95, 97 produces control pressure output, spring 174 keeps valve spools 170 and 172 separated, and forward passage 186 and reverse passage 188 are exhausted through vent ports 190, 192, respectively.

When the reverse range is selected, control pressure in passage 180 moves spools 170, 172 leftward into contact with the valve body, thereby opening a connection between line 184 and reverse passage 188, and exhausting forward passage 186 through vent port 190.

When a forward range is selected, the reverse control pressure drops and forward pressure rises in passage 178, thereby opening a connection between line pressure in passage 182 and forward passage 186, and connecting reverse passage 188 to vent port 192. Vent port 194 maintains zero pressure in the space between the spools.

The diameter of control lands on either of the spools can be made larger than the diameter of the control lands on the other spool in order to produce a default position for the valve in the event that both the forward range solenoid and reverse range solenoid are energized concurrently, a failure mode. For example, if it is desired to default to the forward range position when control pressure in passages 178 and 180 is concurrently applied at substantially equal magnitude and that magnitude is above the pressure required to compress spring 174, if the diameter of the control lands on spool 170 is larger than those of spool 172, then the spools will move rightward in the valve chamber to the position corresponding to the forward range selected position described above. Alternatively, if the diameter of the control lands of the reverse spool are larger than those of the forward spool 170, both spools move leftward in the valve chamber when this failure mode occurs, and the transmission will operate instead in the reverse range.

Having described a preferred embodiment of our invention, what we claim and desire to secure by U.S. Letters Patent is:

1. A system for selecting operating ranges of an automatic transmission, comprising:

a line pressure source a source of control pressure;

a vent port;

range selector means, responsive to selection of a first range and second range, for opening and closing hydraulic connections to the control pressure source;

hydraulic circuit means having a first portion associated with operation of the transmission in the first range and a second portion associated with said operation in the second range; and valve means, responsive to said connections produced by the range selector means, for alternately hydraulically connecting the line pressure source and one of the first portion and second portion, and for hydraulically connecting the vent port to the other of the first portion and second portion, wherein the first range corresponds to one of the group consisting of forward drive and reverse drive, and the second range corresponds to the other of the group consisting of forward drive and reverse drive.

2. The system of claim 1, wherein the valve means comprises:

a spool slidably supported in a chamber, having ports adapted to communicate with the chamber, said spool having control lands mutually spaced thereon to open and close connections among the chamber and said ports;

a first port connected to the first portion;

a second port connected to the second portion;

a third port connected to the fluid pressure source;

a first control port connected to the control pressure source when the first range is selected;

a second control port connected to the control pressure source when the second range is selected; and wherein the vent port is alternately connected and disconnected through the chamber to the ports due to the position of the control lands.

3. The system of claim 1, wherein the range selector means includes:

a first control valve connected to the control pressure source and valve means;

a first circuit including a source of electric power, a first solenoid for opening and closing the first control valve, switch means for closing said first circuit and opening a connection between the control pressure source and valve means when a first range is selected and for closing said connection when a range other than the first range is selected;

a second control valve connected to the control pressure source and valve means; and a second circuit including said source of electric power, a second solenoid for opening and closing the second control valve, switch means for closing said second circuit and opening a connection between the control pressure source and valve means when a second range is selected and for closing said connection when a range other than the second range is selected.

4. A system for selecting operating ranges of an automatic transmission, comprising:

a line pressure source;

a source of control pressure;

a vent:

range selector means, responsive to selection of a first range and second range, for opening and closing hydraulic connections to the control pressure source;

hydraulic circuit means having a first portion associated with operation of the transmission in the first range and a second portion associated with said operation in the second range;

first valve means, responsive to said connections produced by the range selector means, for alternately hydraulically connecting the line pressure source and the first portion, and for hydraulically connecting the vent to the first portion; and second valve means, responsive to said connections produced by the range selector means, for alternately hydraulically connecting the line pressure source and the second portion, and for hydraulically connecting the vent to the second portion, wherein the first range corresponds to one of the group consisting of forward drive and reverse drive, and the second range corresponds to the other of the group consisting of forward drive and reverse drive.

5. The system of claim 4, wherein the first valve means comprises:
- a first spool slidably supported in a chamber, ports adapted to communicate with the chamber, said spool having control lands mutually spaced thereon to open and close connections among the chamber and said ports;
- a first port connected to the fluid pressure source;
- a second port connected to the first portion;
- a first control port connected to the control pressure source when the first range is selected; and
- the vent alternately connected and disconnected through the chamber to the second port due to the position of the control lands;

wherein the second valve means comprises:
- a second spool slidably supported in said chamber, having ports adapted to communicate with the chamber, said spool having control lands mutually spaced thereon to open and close connections among the chamber and said ports;
- a third port connected to the fluid pressure source;
- a fourth port connected to the second portion;
- a second control port connected to the control pressure source when the first range is selected; and
- the vent alternately connected and disconnected through the chamber to the fourth port due to the position of the control lands.

6. The system of claim 4, wherein the range selector means includes:
- a first control valve connected to the control pressure source and valve means;
- a first circuit including a source of electric power, a first solenoid for opening and closing the first control valve, switch means for closing said first circuit and opening a connection between the control pressure source and valve means when a first range is selected and for closing said connection when a range other than the first range is selected;
- a second control valve connected to the control pressure source and valve means; and
- a second circuit including said source of electric power, a second solenoid for opening and closing the second control valve, switch means for closing said second circuit and opening a connection between the control pressure source and valve means when a second range is selected and for closing said connection when a range other than the second range is selected.

* * * * *